United States Patent Office 3,359,331
Patented Dec. 19, 1967

3,359,331
SECONDARY ALCOHOL ETHOXYLATION
Samuel B. Baker and William R. Thompson, Sarnia, Ontario, Canada, assignors to Esso Research and Engineering Company, a corporation of Delaware
No Drawing. Filed Nov. 10, 1965, Ser. No. 507,245
5 Claims. (Cl. 260—615)

The present invention relates to the formation of water-soluble surfactants via the ethoxylation of secondary alkanols. More particularly, the present invention is directed to the formation of water-soluble biodegradable surfactants by the ethoxylation of linear secondary alkanols using a one-step catalytic process.

To date, ethoxylation of secondary alkanols for the production of commercial quantities of water-soluble biodegradable surfactants or detergents has required the use of a two-step process. With this process, the alkanol and ethylene oxide are first contacted with an acidic catalyst, the mixture neutralized and stripped to remove unreacted alcohol followed by a second stage reaction using an alkali catalyst to obtain the desired reaction product (see U.S. Patent 2,870,220). For economic reasons, it is most attractive to employ a one-step method for the production of the ethoxylates as the equipment and processing costs necessary to produce the detergents are materially diminished. One-step processes for the formation of primary alcohol ethoxylates utilizing Friedel-Crafts type catalysts have been reported in the past. However, serious difficulties have been encountered with this system when used to manufacture commercial quantities of the ethoxylate as only very low reagent conversions were obtained and most of the products secured were of a black-brown color. Principally, these difficulties were believed to have been caused due to the deactivation of the catalyst used as it came in contact with the walls of the reactors used.

Now, in accordance with the present invention, it has been discovered that highly attractive low-mole and high-mole detergent grade adducts of secondary alkanols and ethylene oxide can be produced in a one-step reaction system with antimony or tin halide catalysts utilizing "seed" reactor techniques. It has been discovered that the serious deficiencies of antimony and tin halide compounds when used as secondary alcohol ethoxylation catalyst in steel reactors can be overcome by initiating the ethoxylation reaction with the antimony or tin halide catalyst in a nonreaction-inhibiting zone.

After the ethoxylation reaction has been commenced in the nonreaction-inhibiting zone, further amounts of alcohol, ethylene oxide, and catalyst can be contacted with this "seed'" and the total reaction completed in standard steel equipment to yield excellent quality low and high-mole adducts having good color and low yields of by-product polyethylene glycol and 1,4-dioxane.

The term low-mole adduct as used herein denotes a product made from a secondary alcohol condensed with from 2 to 4 molecular equivalents of ethylene oxide. The term high-mole adduct is similarly defined but 6 to 20 molecular equivalents of ethylene oxide are condensed with the alcohol. The low-mole adducts are generally further processed, for example, by sulphation to form ethoxy sulphates used in light duty detergent formulations. The high-mole adducts are nonionic surfactants and are used as such in heavy duty, low-foam detergent formulations or compositions.

In the preferred embodiment of the instant invention, ethylene oxide is reacted with a straight-chain higher secondary alkanol in the presence of either an antimony or tin halide catalysts. The alkanol reactants useful for the formation of the preferred detergent products of this invention generally contain from 8 to 20, preferably from 12 to 18, carbon atoms per molecule. With the present ethoxylation process, a single alkanol or a mixture of secondary alkanols may be used as the process reactant. Representative nonlimiting examples of useful linear, secondary aliphatic alcohols include: 2-hydroxyhexadecane, 3 - hydroxyhexadecane, . . . 8 - hydroxyhexadecane; 2-hydroxypentadecane, 3-hydroxypentadecane . . . 7 - hydroxypentadecane; 2 - hydroxytetradecane, 3 - hydroxytetradecane . . . 7 - hydroxytetradecane; 2-hydroxytridecane, 3-hydroxytridecane . . . 6 - hydroxytridecane; 2-hydroxydodecane, etc., 3 - hydroxydodecane . . . 6 - hydroxydodecane.

Within the reaction zone, the molar ratio of ethylene oxide to alkanol can vary over a wide range. In general, as the molar ratio or ethylene oxide to alkanol increases, the degree of conversion of the alkanol increases; however, yields of undesirable by-products such as polyethylene glycols and 1,4-dioxane are also increased with the increasing ethylene oxide/alkanol molar ratio. Generally, the molar ratio of ethylene oxide to alkanol is brought to about 1:1, preferably 0.1:1, during the time the reaction is being initially started in a nonreaction-inhibiting zone and during the time after the reaction seed is admixed with further amounts of alkanol ethylene oxide and catalyst.

The condensation of the ethylene oxide with the linear alkanol is generally a batch operation and is normally carried out in bulk, that is, in the absence of diluents and in the presence of an excess of one of the reactants. The catalysts used to promote the condensation of the ethylene oxide with the linear alkanol are halides of groups IVa and Va, preferably the halides of antimony and tin, preferably antimony and tin chlorides and bromides. It has been found that in a single-step operation, antimony and tin chlorides and bromides particularly the chlorides serve to promote the formation of high yields of the desired products and small quantities of undesirable by-products.

In commercial operations the antimony and tin catalysts are preferably previously complexed with an ether such as dimethyl ether, diethyl ether, di-isopropyl ether, etc., before addition to the reaction zone. If desired, the catalyst need not be complexed. The amount of catalyst present when the reaction is started in a nonreaction-inhibiting zone and in subsequent operations after further amounts of alkanol and ethylene oxide are added to the seed reaction product can vary from about 0.5 to 1.5 wt. percent, preferably 0.75 to 1.0 wt. percent based on the amount of alkanol present. The amount of catalyst used to promote the condensation of ethylene oxide with any particular alkanol will vary with the type of alkanol used and the nature of the adduct desired.

The reaction for the formation of the desired ethylene oxide-linear alkanol product is carried out at a temperature in the range of from about 30 to 70° C. and preferably from 45 to 65° C. The pressure at which the condensation reaction is carried out is not critical. Good results are obtained when the reaction is conducted at atmospheric pressure, although pressures ranging from less than one atmosphere, e.g. 0.5 atm., to about three atmospheres can be used. The reaction time for the formation of the desired detergent grade products varies with the type of alkanol used, catalyst concentration, and reaction pressure and temperature conditions. Reaction times ranging from about 30 minutes to 2 hours are suitable to obtain appreciable yields of the desired low-mole and high-mole adducts.

The type of reactor used to form the desired ethylene oxide-linear alkanol adducts constitutes a critical feature of the instant invention. Normally, ethoxylation reactions are conducted in mild steel or stainless steel reactors and the catalyst and alkanol is simply introduced into the reactor and ethylene oxide is later passed into the mixture under controlled conditions of temperature and pressure. However, this technique may not be used when antimony or tin halide catalysts, particularly antimony pentachloride and stannic chloride catalysts, are used to promote the condensation reaction. These materials are rapidly inactivated in stainless steel or mild steel reactors. This catalyst deactivation results in very low reagent conversion and highly colored black-brown products. However, these difficulties may be overcome by the use of seed reactor techniques.

It has been discovered that in a typical batch operation if at least about 0.25–0.5% by weight of the total amount of alkanol, ethylene oxide and catalyst programed for the batch are first brought to a nonreaction-inhibiting zone under the desired temperature and pressure conditions for the reaction for a time sufficient to commence the ethoxylation reaction, which reacting material or seed is then transferred to the principal reactor formed of stainless steel or the like and contacted with the remaining amounts of alkanol, ethylene oxide, and catalyst programed for the particular batch and the total mixture maintained at reaction temperature and pressure conditions, high-quality, relatively clear detergent grade adducts of ethylene oxide and the linear alkanol are secured. Surprisingly, it has been discovered that once at least a portion of the process reagents have begun reacting, the total reaction may be carried out in stainless steel or mild steel reactors without the catalyst-inhibiting effect normally associated with the use of Sn or Sb catalyst in such reactors.

The initial reaction between the ethylene oxide and secondary alkanol promoted by either antimony or tin halide catalysts must be initially commenced in a non-reaction-inhibiting zone such as in a reactor formed from ceramics, glass, glass-lined steel, thermosetting resin-lined steel or thermoplastic, non-reacting insoluble polymer-lined steel. Reactors formed from glass-lined or polytetrafluoroethylene-lined steel are preferred for use in the process of the present invention.

Alternatively, if it is not desired to use a separate seed reactor, a typical steel reactor having its bottom portion coated with glass or a nonreactive insoluble polymer or resin can be used. With this type of reactor, minor amounts, at least about 0.25 to 0.50 wt. percent, of the total amount of secondary alkanol, ethylene oxide and catalyst programed for the run are first introduced into the coated portion of the reactor and the condensation reaction started. After the reaction has commenced the remaining amounts of ethylene oxide, secondary alkanol and catalyst can be added to the reactor. With this type of operation, contact of the initial catalyst and alkanol with the uncoated reactor walls must be avoided.

In a typical laboratory reaction procedure, a glass reaction flask equipped with a stirrer, gas inlet sparger and gas outlet tube is charged with one gram mole of a mixture of secondary alkanols formed by the air oxidation of $C_{12}$ to $C_{15}$ normal paraffins and 0.5 wt. percent, based on alcohol, of diethyl ether complexed antimony pentachloride. This solution is then heated to about 60° C. and ethylene oxide gas is injected through the sparger into the vigorously agitated solution. After a short induction period of about several minutes the reaction begins as indicated by the absorption of ethylene oxide into the reaction mixture.

After the ethoxylation reaction is initiated in the seed reactor, the vigorously reacting system is then pumped into a stainless steel reactor equipped with a stirrer and gas inlet and outlet tubes. The reactor and its contents are maintained at a temperature varying from about 30 to 70° C. After the introduction of the "seed," approximately five gram moles of the same alkanol mixture is pumped into the reactor and gaseous ethylene oxide injected into the system through the gas inlet tube. Ethylene oxide is continuously introduced into the stainless steel reactor until adducts containing about 10 moles of ethylene oxide per mole of alkanol are obtained. At this point the reaction is voluntarily terminated. The total reaction mixture is then neutralized with ammonium hydroxide and filtered to remove catalyst residues.

In order to further illustrate the practice of the invention the following examples are provided but it should be understood, however, that they should not be construed as limiting the same in any manner whatsoever.

EXAMPLE 1

To demonstrate the effectiveness of the one-step process of the present invention, a series of ethoxylation reactions were conducted in glass reactors with various types of catalysts. In each test 2-octanol was contacted with varying amounts of ethylene oxide in the presence of a particular catalyst at the temperatures and pressures set forth in the table below. At the completion of each of the ethoxylation experiments, the products formed were analyzed to determine the amount of conversion of alcohol and also to determine the amount of undesirable by-products formed. Additionally, each of the products was analyzed using gas chromatographic techniques to determine the extent of ethylene oxide adduction and the distribution of the adducts in the final product. The results of the experiments are set forth in Table I below.

TABLE I

| Run No. | 1 | 2 | 3 | 4 |
| --- | --- | --- | --- | --- |
| Catalyst type | $SnCl_4$ | $SnCl_4$ | $SnCl_4$ | $SbCl_5$ |
| Wt. percent on alcohol [1] | 0.5 | 2.0 | 1.5 | 1.0 |
| Temperature, °F | 200–350 | 130–190 | 140–160 | 170–190 |
| Pressure, p.s.i.g. | 20–25 | 24–36 | 20–30 | 10–42 |
| Product analyses: [2] | | | | |
| Moles ETO/Mole ROH | 1.3 | 3.5 | 3.1 | 3.5 |
| Dioxane, wt. percent [3] | 0.3 | 0.4 | 0.5 | 0.7 |
| Alcohol, wt. percent [3,4] | 20.0 | 5.4 | 6.5 | 2.5 |
| PEG, wt. percent | | 3.4 | 2.3 | 2.1 |
| Conversions, wt. percent: | | | | |
| Alcohol [5,6] | 71.3 | 88.2 | 86.5 | 94.6 |
| ETO to dioxane | 1.0 | 0.8 | 1.0 | 1.3 |
| ETO to PEG | | 6.3 | 4.4 | 3.9 |
| Distribution by G.C.: | | | | |
| Area, percent | (7) | (7) | (7) | (7) |
| Light ends | 1.0 | 1.2 | 1.5 | 1.2 |
| Alcohol | 25.2 | 8.2 | 8.7 | 3.8 |
| Unknown | 0.7 | 0.2 | 0.2 | |
| 1 MA [8] | 30.5 | 13.5 | 12.4 | 6.4 |
| Unknown | | | 0.5 | |
| 2 MA [8] | 23.0 | 23.5 | 19.6 | 12.9 |
| Unknown | | | 0.5 | |
| 3 MA [8] | 14.0 | 23.8 | 19.9 | 16.6 |
| Unknown | | | 0.4 | |
| 4 MA [8] | 4.4 | 15.4 | 13.3 | 17.1 |
| Unknown | | | 0.6 | |
| 5 MA [8] | 0.9 | 8.5 | 11.2 | 16.3 |
| Unknown | | | 1.6 | |
| 6 MA [8] | | 2.1 | 5.3 | 11.5 |
| Remainder | 0.2 | 1.4 | 4.3 | 14.2 |

[1] Water in reagent 2-octanol 1370 p.p.m.
[2] G.C. on F and M 720, 2′ SGR column.
[3] By G.C. using internal standard.
[4] 2-octanol contained some ketone, which was not resolved on the 2′ G.C. column. Number are corrected for ketone, but may be somewhat low.
[5] Ethylene glycol has the same retention time as 2-octanol and the shape of curve indicates presence of ethylene glycol.
[6] Estimated conversion after correction for ethylene glycol.
[7] G.C. on F and M 720, 10′ SGR column.
[8] 1 MA, 2 MA, 3 MA, 4 MA, 5 MA, 6 MA, are respectively 1, 2, 3, 4, 5, 6, mole ethylene oxide adducts per mole alkanol.

The results of the above tests demonstrate the efficiency of the tin and antimony halide materials as one-step catalysts for the ethoxylation of secondary alkanols. As is set forth in the data above, extremely high product conversions based on alganol were obtained with the antimony catalyst (run 4). Both $SnCl_4$ and $SbCl_5$ catalysis show high alkanol conversions to surfactant products; the $SbCl_5$ being the preferred catalyst. The low yields of by-products, dioxane and polyethylene glycol, indicates very little loss of ethylene oxide in by-product formation. In addition processing steps, normally required to remove by-products in ethoxylation processes, are not required.

EXAMPLE 2

To illustrate the inhibitory affect of the various meals upon the tin and antimony based ethoxylation catalysts, a series of reactions were conducted wherein minor amounts of various types of metal powders were added directly to the ethoxylation reactor containing either 2-octanol or a smear of $C_{12}$ to $C_{15}$ secondary alkanols along with from 0.5 to 1.0 wt. percent of antimony pentachloride based on alkanol feed. Each of the reactions were conducted in a 4-necked, jacketed glass flask, equipped with a high-speed air stirrer, gas sparger extending from 1 to 2 centimeters from the outer edge of the stirrer paddle, thermometer and reflux condenser. The top of the reflux condenser was connected through a trap to a pressure equalizing flask containing light petroleum oil so that a pressure head of 25 millimeters of mercury, maximum, would be maintained in the system. The reactor and its contents were maintained at a temperature in the range of from 55 to 60° C. by the use of thermostatically controlled water flow through the flask jacket.

Prior to the introduction of ethylene oxide, a small amount of either nickel powder, mild steel powder, antimony powder or No. 316 stainless steel powder was added to each of the reactors. Ethylene oxide flow to the reactor was then commenced. In every case there was little or no adsorption of the ethylene oxide indicating that there was no reaction of the ethylene oxide with the secondary alkanol. Introduction of additional catalyst (0.5 wt. percent on alcohol) had no effect.

In another reaction a smear of $C_{12}$ to $C_{15}$ secondary alkanols was ethoxylated utilizing antimony pentachloride catalyst as per the procedure of Example 1. During the course of the reaction finely divided nickel powder was added to the system. Surprisingly, there was no cessation of reaction and, indeed, even after standing overnight, it was possible to re-start the ethoxylation simply by returning the mixture to normal reaction temperature and continuing the flow of ethylene oxide. These experiments indicate that once the ethoxylation reaction has started, a truly inhibitory metal such as nickel has no apparent effect on the continuation of the ethoxylation. Therefore, a glass, ceramic or nonreactive resin coated "seed" reactor can be used to initiate the ethoxylation and then the reacting system may be transferred to standard stainless steel equipment and the ethoxylation continued to the degree required.

EXAMPLE 3

To demonstrate the critical nature of utilizing tin and antimony halides, particularly $SnCl_4$ and $SbCl_5$, as catalysts in a one-step process for the formation of secondary alkanol ethoxylates, a series of ethoxylation experiments were conducted with various types of materials used as the ethoxylation catalyst. Each of the experiments were conducted in either glass or stainless steel reactors and 1.0 wt. percent of catalyst was used based upon the weight of the 2-octanol reagent. Reaction pressure was maintained at about 20 p.s.i.g. and temperature varied from 100 to 300° F. The results of the ethoxylation experiments are set forth in Table II below.

*Table II.—Catalysts studied for the ethoxylation of 2-octanol*

| Catalyst: | Remarks |
| --- | --- |
| $FeCl_3$ | Very little reaction. |
| $CdCl_2$ | No reaction. |
| $(n-Bu)_2SnCl_2$ | Do. |
| $MoCl_5$ | Slow reaction at 300° F. |
| $(n-Bu)_2SnCl_2/MoCl_5$ | Do. |
| $WCl_6$ | No reaction. |
| $FeF_3$ | Do. |
| $CoF_3$ | Do. |
| $NiF_2$ | Do. |
| $PdCl_2$ | Do. |
| $MgCl_2$ | Do. |
| $PCl_3$ | Do. |
| $AlF_3$ | Do. |
| p-Toluene sulphonic acid | Extremely slow reaction. |
| Benzene sulphonic acid | No reaction. |
| $BCl_3$ | Do. |
| $BF_2Cl + BFCl_2$ | Slow reaction. |
| $ClCH_2CH_2-O-Sb(OR)_4$ | No reaction. |
| HCl | Do. |
| $ZnCl_2$ | Very slow reaction. |
| $MnCl_2$ | No reaction. |
| $CoCl_2$ | Do. |
| $TiF_4$ | Do. |
| $CoF_2$ | Do. |
| $BF_3$, urea | Very slow reaction. |
| Hexamethylene tetramine | No reaction. |
| Tetraethylene ammonium bromide | Do. |
| $BF_3$ | Good reaction but excessive by-product formation. |
| $BF_3 \cdot H_3PO_4$ complex | Do. |

As can be seen by referring to the data above, a wide variety of the so-called Friedel-Crafts acidic compounds have little or no catalytic activity for promoting the ethoxylation of linear secondary alkanols in a one-step process scheme. While boron trifluoride and boron trifluoride complexed with phosphoric acid showed some catalytic activity for the ethoxylation of linear secondary alcohols, their use resulted in the formation of commercially excessive amounts of by-product polyethylene glycol and 1,4-dioxane. By product formation can be directly related to the type of catalyst used. Catalysts such as boron trifluoride are believed to form 1:1 complexes with ethylene oxide and there is a tendency for this complex to vaporize at reaction conditions. Once in a vapor phase this complex tends to isomerize ethylene oxide to acetaldehyde which is a by-product precursor. Catalysts such as $SnCl_4$ and $SbCl_5$ serve to form 1:2 complexes with ethylene oxide and such complexes tend to remain in the liquid phase. Thus, by-product formation is reduced.

It is to be understood that this invention is not limited to the specific examples which have been offered merely as illustrations and that modifications may be made without departing from the spirit of the invention.

What is claimed is:

1. A batch method for the formation of secondary alkanol ethoxylates comprising contacting at reaction conditions a secondary alkanol having from 8 to 20 carbon atoms with ethylene oxide in the presence of a catalyst selected from the group consisting of $SnCl_4$ and $SbCl_5$, said reaction being initially conducted with at least about 0.25–0.5 wt. percent of said alkanol, ethylene oxide, and catalyst programed for said batch in a glass, ceramic or nonreactive resin coated reactor for a time sufficient to commence the ethoxylation reaction, said ethoxylation being conducted at a temperature in the range of from about 30 to 70° C., transferring at least a portion of said reacting mixture to a steel reactor and contacting said reacting mixture with the remaining amounts of alkanol, ethylene oxide, and catalyst programed for said batch for a time sufficient to obtain a substantial product yield.

2. The method of claim 1 wherein from 0.5 to 1.5 wt. percent of catalyst based on alkanol is used.

3. The method of claim 2 wherein said ethoxylation reaction is conducted at a temperature in the range of from about 45 to 65° C. and at a pressure varying from 0.5 to 3 atmospheres.

4. The method of claim 3 wherein the molar ratio of ethylene oxide to alkanol in said reaction zones varies from about 1:1 to 0.1:1.

5. The method of claim 4 wherein said secondary alcohol has from 12 to 18 carbon atoms.

References Cited

UNITED STATES PATENTS

| | | | |
|---|---|---|---|
| 2,253,723 | 8/1941 | Moore | 260—615 |
| 2,327,053 | 8/1943 | Marple et al. | |
| 2,380,185 | 7/1945 | Marple et al. | 260—615 |
| 2,870,220 | 1/1959 | Carter | 260—615 |

FOREIGN PATENTS 525,843  6/1956  Canada.

LEON ZITVER, *Primary Examiner.*

H. T. MARS, *Assistant Examiner.*